United States Patent [19]

Taguchi

[11] Patent Number: 4,953,046
[45] Date of Patent: Aug. 28, 1990

[54] DEVICE FOR SUPPORTING MAGNETIC HEADS FOR DOUBLE SIDED DISCS

[75] Inventor: Katsuhiko Taguchi, Chofu, Japan

[73] Assignee: Juki Corporation, Chofu, Japan

[21] Appl. No.: 409,983

[22] Filed: Sep. 19, 1989

Related U.S. Application Data

[63] Continuation of Ser. No. 856,757, Apr. 28, 1986, abandoned.

[30] Foreign Application Priority Data

Apr. 27, 1985 [JP] Japan .............................. 60-63996[U]

[51] Int. Cl.$^5$ .......................... G11B 5/48; G11B 21/16
[52] U.S. Cl. .................................................. 360/104
[58] Field of Search ........................ 360/104, 102–103, 360/105, 107, 109

[56] References Cited

U.S. PATENT DOCUMENTS

| 4,197,566 | 4/1980 | Suzuki et al. | 360/103 |
| 4,306,258 | 12/1981 | Higashiyama et al. | 360/104 |
| 4,379,316 | 4/1983 | Krane | 360/105 |

FOREIGN PATENT DOCUMENTS 59-160831  11/1984  Japan .................................. 360/104

*Primary Examiner*—John H. Wolff
*Attorney, Agent, or Firm*—Morgan & Finnegan

[57] ABSTRACT

A device for supporting magnetic heads for double sided magnetic discs includes two pivot points for both the upper and lower magnetic head support plates in a manner that the connecting line of both upper pivot points and the connecting line of both lower pivot points are crossing. The degreee of contact between the magnetic heads and a magnetic disc is improved since both support plates are incorporated with each other to absorb the opposite side's deflection.

2 Claims, 2 Drawing Sheets

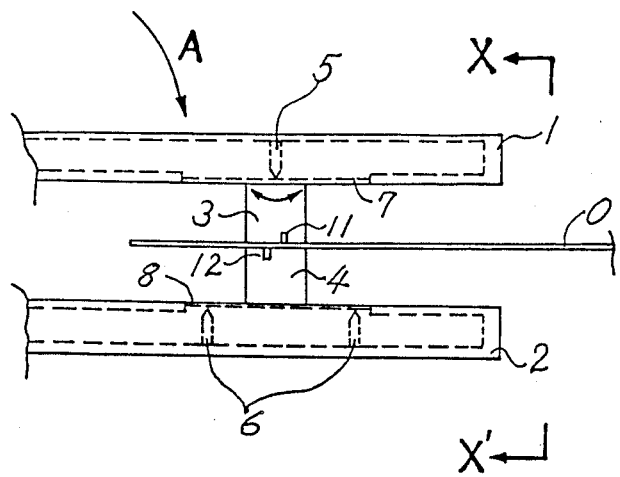
FIG. 1
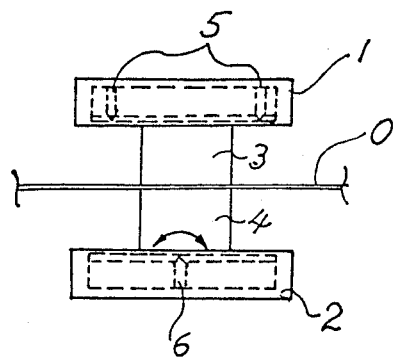
FIG. 2
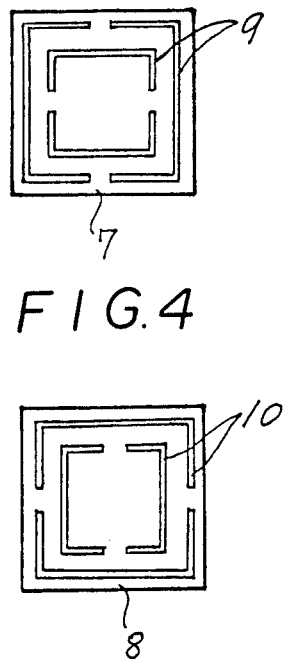
FIG. 3
FIG. 4

DEVICE FOR SUPPORTING MAGNETIC HEADS FOR DOUBLE SIDED DISCS

This is a continuation of co-pending application Ser. No. 06/856,757, filed on Apr. 28, 1986 now abandoned.

FIELD OF THE INVENTION

The invention relates to a supporting device for magnetic heads, and more particularly, to a supporting device for magnetic heads used on a double sided magnetic disc.

BACKGROUND OF THE INVENTION

FIGS. 5 and 6 illustrate a conventional way of supporting magnetic heads used on a double sided magnetic disc. An upper magnetic head 3 is fixed on an upper support or gimbal plate 7. A lower magnetic head 4 is fixed on a lower support or gimbal plate 8. Numerals 1 and 2 denote arms which clamp heads 3 and 4. Upper arm 1 is urged to press-down lower arm 2 in the direction of arrow A by means of spring (not shown). Both support plates 7 and 8 are fixed to arms 1 and 2, respectively. Thus, a magnetic disc 0 may be clamped between the upper magnetic head 3 and the lower magnetic head 4.

A core 11 of the upper magnetic head 3 may be spaced 0.75 mm horizontally from a core 12 of the lower magnetic head 4. This 0.75 mm spacing is equivalent to four tracks of the magnetic disc 0. One disc track pitch is typically 0.1875 mm. Thus, four times 0.1875 mm, namely 0.75 mm, is provided as the space.

According to the conventional way of supporting such magnetic heads, as FIGS. 5 and 6 illustrate, tips of pivots 5 and 6 contact the central back side portions of the support plates 7 and 8, respectively. As the magnetic heads are supported by single pivot points, the magnetic heads 3, 4 tend to rotate in the direction of the double-headed arrows as shown in FIG. 5 and FIG. 6.

Such free-rotational support as illustrated in FIGS. 5 and 6 is intended to have the magnetic heads contact closely with the flexible magnetic disc. However, the tips of the pivots 5 and 6 are not always positioned at the center of the magnetic heads, since such magnetic heads are commonly used in disc drives of different manufacturers.

If magnetic heads 3 and 4 are fixed with respect to each other so as to maintain a horizontal spacing of four tracks' distance therebetween, pivots 5 and 6 may not be pin-pointed. In such a case, referring to FIG. 7, when the magnetic heads 3 and 4 are undergoing rotational moments by means of the spring provided upon the upper arm 1, the magnetic disc 0 tends to be torsioned, bent, or the like, whereby the disc may be damaged. Additionally, accurate recording or replaying of the disc may accordingly be impossible.

OBJECTS OF THE INVENTION

It is therefore an object of the invention to provide an apparatus for supporting a magnetic head so that its core surface completely contacts the magnetic disc.

It is a further object of the invention to provide an apparatus for supporting magnetic heads wherein the magnetic heads will clamp the magnetic disc therebetween with a proper load, and maintain a correct horizontal deviation or space (for example, 0.75 mm for four tracks) between both the upper and the lower heads while providing the magnetic disc with some degree of flexibility.

SUMMARY OF THE INVENTION

Conventionally, magnetic head support-plates were supported by means of a single pivot so that the magnetic heads had a high degree of freedom. According to the instant invention, the above objects of the invention are met by providing an apparatus for supporting magnetic disc heads wherein two pivots are provided for each of the upper and lower magnetic head support-plates in such a manner that the center portion of a line connecting both pivots upon an upper support-plate and the center portion of a line connecting both pivots upon a lower support-plate intersect when plan-viewed.

BRIEF DESCRIPTION OF THE DRAWINGS

The invention will be described in greater detail below by way of reference to the accompanying drawings, in which:

FIG. 1 is an elevation view of a device for supporting a magnetic head according to the invention;

FIG. 2 is a side view of the embodiment of FIG. 1 viewed along the line X—X';

FIG. 3 is a bottom view of an upper support plate according to the invention;

FIG. 4 is a bottom view of a lower support plate according to the invention;

FIG. 8 is a perspective exploded view of the magnetic head supporting system of the present invention.

DETAILED DESCRIPTION OF THE DRAWINGS

Figure 5:
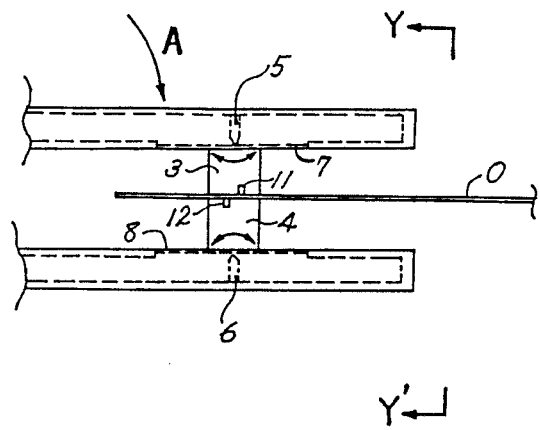
FIG. 5 is an elevation view of a conventional device for supporting magnetic heads.
Figure 6:
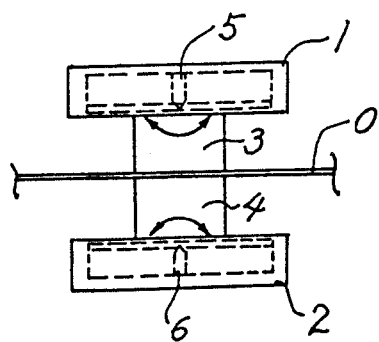
FIG. 6 is a side view of the embodiment of FIG. 5 viewed along Y—Y'.

Referring to FIGS. 1 and 2, one embodiment of the invention will now be explained. In FIGS. 1 and 2, an upper magnetic head 3 is fixed to an upper support gimbal plate 7. A lower magnetic head 4 is fixed to a lower support gimbal plate 8. The upper support plate 7 is fixed to an upper arm 1. The lower support plate 8 is fixed to a lower arm 2.

The upper support plate 7 may be configured as shown in FIG. 3. The very thin metallic upper support plate 7 is provided with "U" shaped slits 9. These slits 9 are very effective so as to impart flexibility to the support plate 7 whereby the magnetic head softly contacts with the magnetic disc so as to apply a constant load upon the magnetic disc.

The lower support plate 8 is configured as shown FIG. 4, and has "U" shaped slits 10 similar to those provided for the upper support plate 7. However, the slits 10 of lower support plate 8 are deviated by 90° compared with slits 9 of the upper support plate 7. The purpose of such a deviation is to equalize the load occurring at each portion of both the upper and lower support plates when both upper and lower magnetic heads clamp the magnetic disc therebetween.

Figure 7:
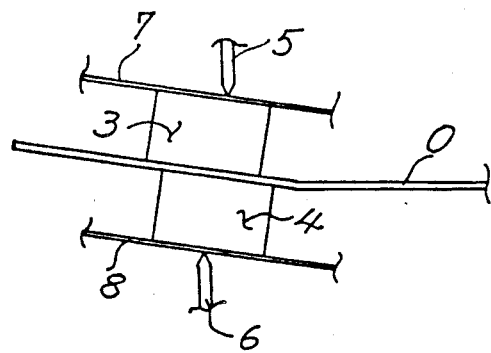
FIG. 7 explains how a magnetic disc is deflected when both upper and lower pivots are not lined as was the case in the prior art.

To sustain the deflection of the support plates 7 and 8, the upper support plate 7 is sustained by two pivots 5, (FIGS. 1 and 2), and the lower support plate 8 is also sustained by two pivots 6. Thereby, the magnetic heads tend to rotate in the direction of the double-headed arrows shown in FIGS. 1 and 2. In this embodiment of the invention, the directions of these rotations cross perpendicularly with respect to each other. So far as the direction of rotation is different, when both magnetic heads contact the magnetic disc 0, each magnetic head acts together with the other head so as to absorb deflections of each other. Thus, the degree of contact between the magnetic heads and the magnetic disc is highly improved. Additionally, with the invention, deflection of the magnetic disc due to the rotational moment impressed thereon, as shown in FIG. 7, is avoided. Further, the separated distance between both upper and lower cores is correctly maintained.

As aforementioned, according to the invention, the degree of contact between the magnetic head and the magnetic disc is improved greatly, and the separated distance between cores is accurately maintained resulting in a higher degree of accuracy of recording and replaying. Damage to the magnetic disc is also avoided.

As many apparently widely different embodiments of the invention may be made without departing the spirit and scope therein, it is to be understood that invention is not limited to the specific embodiments herein described, but rather, the invention is to be defined only in accordance with the claims which follow.

I claim:

1. A magnetic head supporting system for supporting magnetic heads for double-sided magnetic discs, comprising:

a first magnetic head for operative engagement with one side of said double-sided magnetic disc;

a first gimbal plate having a first surface upon which said first magnetic head is fixedly secured;

first pivot means, comprising a pair of linearly spaced discrete pivots operatively contacting a second surface of said first gimbal plate, for defining a first pivot plane about which said first magnetic head can pivot;

a second magnetic head for operative engagement with the other side of said double-sided magnetic disc;

a second gimbal plate having a first surface upon which said second magnetic head is fixedly secured; and second pivot means, comprising a pair of linearly spaced discrete pivots operatively contacting a second surface of said second gimbal plate, for defining a second pivot plane, which is disposed substantially perpendicular with respect to said first pivot plane, about which said second magnetic head can pivot;

each of said first and second gimbal plates having a substantially square configuration and being provided with a radially inner pair of substantially U-shaped slits and a radially outer pair of substantially U-shaped slits for imparting flexibility to said each of said first and second gimbal plates; and wherein said radially inner and radially outer pairs of U-shaped slits defined within said first gimbal plate are disposed 90° out-of-phase with respect to said radially inner and radially outer pairs of U-shaped slits defined within said second gimbal plate so as to impart flexibility within each of said first and second gimbal plates, relative to each other, in two mutually orthogonal directions.

2. A magnetic head supporting system for supporting magnetic heads for double-sided magnetic discs, comprising:

a first magnetic head for operative engagement with one side or said double-sided magnetic disc;

a first gimbal plate having a first surface upon which said first magnetic head is fixedly secured;

first linearly extending pivot means, operatively contacting a second surface of said first gimbal plate, for defining a first pivot plane about which said first magnetic head can pivot;

a second magnetic head for operative engagement with the other side of said double-sided magnetic disc;

a second gimbal plate having a first surface upon which said second magnetic head is fixedly secured; and second linearly extending pivot means, operatively contacting a second surface of said second gimbal plate, for defining a second pivot plane, which is disposed substantially perpendicular to said first pivot plane, about which said second magnetic head can pivot; wherein each of said first and second gimbal plates is provided with a radially inner pair of substantially U-shaped slits and a radially outer pair of substantially U-shaped slits for imparting flexibility to said each of said first and second gimbal plates; and wherein said radially inner and radially outer parts of U-shaped slits defined within said first gimbal plate are disposed 90° out-of-phase with respect to said radially inner and radially outer pairs of U-shaped slits defined within said second gimbal plate so as to impart flexibiity within each of said first and second gimbal plates, relative to each other, in two mutually orthogonal directions.

* * * * *

UNITED STATES PATENT AND TRADEMARK OFFICE
CERTIFICATE OF CORRECTION

PATENT NO. : 4,953,046

DATED : August 28, 1990

INVENTOR(S) : Katsuhiko Taguchi

It is certified that error appears in the above-identified patent and that said Letters Patent is hereby corrected as shown below:

In Column 4, Claim 2, line 20, delete "or" and insert --of--.

Signed and Sealed this

Twenty-fourth Day of December, 1991

Attest:

HARRY F. MANBECK, JR.

*Attesting Officer*     *Commissioner of Patents and Trademarks*